United States Patent
Aab et al.

(10) Patent No.: US 6,856,638 B2
(45) Date of Patent: Feb. 15, 2005

(54) RESONATOR ARRANGEMENT FOR BANDWIDTH CONTROL

(75) Inventors: Konstantin Aab, Kassel (DE); Juergen Kleinschmidt, Weissenfels (DE); Peter Lokai, Goettingen (DE); Matthias Ulrich, Rosdorf (DE)

(73) Assignee: Lambda Physik AG, Goettingen (DE)

( * ) Notice: Subject to any disclaimer, the term of this patent is extended or adjusted under 35 U.S.C. 154(b) by 83 days.

(21) Appl. No.: 10/035,351

(22) Filed: Oct. 19, 2001

(65) Prior Publication Data

US 2002/0141471 A1 Oct. 3, 2002

Related U.S. Application Data

(60) Provisional application No. 60/242,602, filed on Oct. 23, 2000.

(51) Int. Cl.[7] .................................................. H01S 3/22
(52) U.S. Cl. .............................................. 372/57; 372/55
(58) Field of Search ...................................... 372/55–57

(56) References Cited

U.S. PATENT DOCUMENTS

| 5,095,492 A | | 3/1992 | Sandstrom ................... 372/102 |
| 5,970,082 A | | 10/1999 | Ershov ......................... 372/102 |
| 6,094,448 A | | 7/2000 | Fomenkov et al. .......... 372/102 |
| 6,154,470 A | | 11/2000 | Basting et al. ................ 372/19 |
| 6,192,064 B1 | * | 2/2001 | Algots et al. .................. 372/99 |
| 6,212,217 B1 | * | 4/2001 | Erie et al. .................... 372/102 |
| 6,493,374 B1 | * | 12/2002 | Fomenkov et al. .......... 372/102 |
| 6,529,531 B1 | * | 3/2003 | Everage et al. ................ 372/20 |

FOREIGN PATENT DOCUMENTS

DE 40 29 687 A1 9/1990 ........... H01S/3/082

OTHER PUBLICATIONS

B. Rückle et al., "Tuning ranges of an injection–locked excimer laser," *Optics and Laser Technology*, vol. 19, No. 3, Jun. 1987, pp. 153–157.

* cited by examiner

*Primary Examiner*—Don Wong
*Assistant Examiner*—Hung Tran Vy
(74) *Attorney, Agent, or Firm*—Stallman & Pollock LLP (57) ABSTRACT

A line-narrowed excimer or molecular fluorine laser system includes a discharge chamber filled with a gas mixture at least including molecular fluorine and a buffer gas, multiple electrodes within the discharge chamber connected to a discharge circuit for energizing the gas mixture, a resonator including a pair of resonator reflecting surfaces disposed on either side of the discharge chamber for generating a laser beam, and a line-narrowing/selection unit within the resonator for narrowing the bandwidth of the laser beam. The resonator further includes a third reflecting surface which is deformable and disposed between the pair of resonator reflecting surfaces. The line-narrowing/selection unit preferably includes a beam expander and a dispersive element, wherein the deformable third reflecting surface is disposed between the beam expander and the dispersive element.

47 Claims, 3 Drawing Sheets

RESONATOR ARRANGEMENT FOR BANDWIDTH CONTROL

PRIORITY

This application claims the benefit of priority to U.S. provisional patent application No. 60/242,602, filed Oct. 23, 2000.

BACKGROUND OF THE INVENTION

1. Field of the Invention

The invention relates to narrow bandwidth lithographic exposure systems such as excimer and molecular fluorine laser systems, and particularly including a line-narrowing resonator configuration including fixed or adjustable wavefront curvature compensation.

2. Discussion of the Related Art

Line-narrowed excimer lasers are applied in the field of photolithography for production of integrated circuits. Achromatic imaging optics for this wavelength region are difficult to produce. For this reason line-narrowed excimer laser radiation is generated for use in photolithographic applications in order to prevent errors caused by chromatic aberrations. Exemplary bandwidths for different imaging systems are tabulated in Table 1 for the excimer laser wavelengths 248 nm (KrF laser), 193 nm (ArF laser), and for the molecular fluorine laser wavelength 157 nm ($F_2$-laser).

TABLE 1

| imaging optics | 248 nm | 193 nm | 157 nm |
| --- | --- | --- | --- |
| refractive optics: | 0.4–0.6 pm | 0.3–0.6 pm | 0.1 pm |
| catadioptics | 20–100 pm | 10–40 pm | approx. 1 pm |

Narrow band excimer lasers such as ArF lasers emitting around 193 nm and KrF lasers emitting around 248 nm, as well as in the near future $F_2$ lasers emitting around 157 nm, are used in the semiconductor industry in the production of the integrated circuits to make structures at or below 0.25 µm, such as around 0.18 µm or below. Even smaller structures will be produced used extreme ultraviolet (EUV) exposure radiation sources such as generating radiation at wavelengths between 11 nm and 15 nm. To prevent imaging errors caused by chromatic aberrations, radiation of narrow bandwidth, i.e., less than 1 pm and particularly in the range 0.3–0.6 pm, may be used. Another important laser beam parameter is the spectral purity, which is related to the bandwidth and is defined as the spectral range that contains 95% of the output pulse energy. New high numerical aperture (NA) imaging optics used in the photolithography work with exposure radiation having a bandwidth of less than 1 pm.

Current lithography lasers operate at repetition rates typically of up to 2 kHz. To produce higher throughput, it is desired to operate these lithography lasers at higher repetition rates such as 4 kHz or more (e.g., even 10 kHz or more). The averaged power incident upon optical elements within the laser cavity generally increases as the laser is operated at higher and higher repetition rates, and will rise by a factor of two or more when the repetition rate is increased from 2 kHz to 4 kHz or more. A very high thermal load on intracavity optical components, especially of narrow band optics such as prisms or etalons, can cause undesirable wavefront distortions in the laser beam, even at 1–2 kHz, and especially at higher repetition rates. These wavefront distortions are typically caused by thermally induced changes of the refractive indices of materials of the intracavity optical components resulting in time dependent variations of the spectral distribution of the laser beam, and of near and far field intensity distributions. It is desired to have a high power laser, particularly for photolithographic applications, wherein effects of wavefront distortions are reduced or prevented, such as by providing a resonator having intracavity wavefront correction or compensation.

A typical line-narrowing arrangement used in the excimer lasers, e.g., as set forth at Rückle et al. Optics and Laser Technol. 19, 153–157, 1987, includes a high order echelle grating, a prism beam expander and an output coupling partial reflectivity mirror. The wavelength of the laser can be tuned by turning the grating, a folding mirror when a Littman configuration is used, or one or more of the prisms in the beam expander. The wave front of the radiation in front of the grating typically deviates from the flat due to distortions in the resonator optics. This can generate a spectral degradation of the beam and an increase in the laser output beam bandwidth.

As mentioned, another important beam parameter is the "spectral purity" or the wavelength interval that contains, e.g., 95% of the energy of the laser radiation. Excimer lasers may include a planar diffraction grating within its resonator for providing dispersion as a wavelength selector for narrowing the bandwidth of the laser oscillation. To increase the resolution of the grating, a beam expander may be used to reduce the beam divergence. Even when a beam expander is used, the wavefront of the beam in front of or incident upon the grating is generally not planar. The radius of curvature of the wavefront may instead depend on the magnification of the beam expander in the region of, e.g., 400 m . . . 1200 m. The curved wavefront results in a broader spectral linewidth or bandwidth due to the fact that different portions of the curved wavefront strike the planar grating at different angles.

It is recognized in the present invention that it is desired to solve the above-described problem by providing an excimer or molecular fluorine laser resonator having wavefront compensation, and preferably including adjustable wavefront curvature correction, so that the incoming beam wavefront substantially matches the surface of the line-narrowing grating or other dispersive element such as a prism or an interferometric device.

SUMMARY OF THE INVENTION

In view of the above, an excimer or molecular fluorine laser system is provided including a discharge chamber filled with a gas mixture at least including molecular fluorine and a buffer gas, multiple electrodes within the discharge chamber connected to a power supply circuit for energizing the gas mixture, a resonator for generating a laser beam, a line-narrowing unit within the resonator preferably including multiple optical components such as a beam expander and a grating, and a wavefront compensating optic for adjusting the curvature of the wavefront of the beam for compensating wavefront distortions and thereby enhancing the spectral purity of the beam.

The line-narrowing unit may include a beam expander and grating arranged in Littman configuration, such that the expanded beam is reflected from a mirror onto the grating. In this arrangement, the preferred wavefront compensating optic is the mirror disposed between the beam expander and the grating of the line-narrowing unit. The mirror has a curvature at least cylindrically in the direction of dispersion of the grating for adjusting the wavefront of the light before it strikes the grating, and the curvature may be spherical and even aspherical. The curvature of the mirror is preferably adjustable so that the wavefront compensation it provides is adjustable, and wherein the bandwidth of the beam may be minimized and/or selected by adjustment of the curvature of the mirror.

The preferred configuration of the mirror having adjustable curvature includes a bi-directional bandwidth controlled folding mirror assembly. The assembly may include a substantially flat folding mirror, endplates bonded to the mirror, springs attached between a wall and spindle head, an adjustment spindle going through the wall and extending to the end plates, and a movable spherical nut on the adjust spindle. The lined surface of the folding mirror can be made more concave (or less convex) by screwing the fine spindle in a direction out of the mirror compressing the springs to pull the end plates toward the wall. The mirror surface can be made more convex (or less concave) by screwing the fine spindle in the opposite direction provided that the end-plates were slightly compressed toward the wall before the flat mirror was bonded to the endplates. The spindle may be replaced by one or more piezo transducers, or a motorized spindle. Wavelength tuning may be performed by pivoting the grating or one or more prisms in the beam expander and/or the mirror itself. The bandwidth can be actively controlled using a feedback loop including a bandwidth monitor (e.g., a Fabry-Perot etalon or grating monochromator) and preferably including a processor control. The arrangement may be used with an excimer laser, molecular fluorine laser, tunable dye laser, or a solid state laser such as an OPO, TiS or Alexandrite Laser.

A method of adjusting the bandwidth of a line-narrowed excimer or molecular fluorine laser is also provided including applying electrical pulses to electrodes within the discharge chamber for energizing the gas mixture therein and generating a laser beam using a pair of resonator reflectors, measuring a bandwidth of the laser beam, and adjusting a surface contour of a deformable third reflecting surface for adjusting the bandwidth of the laser beam based on the measured bandwidth. The method may further include transmitting a signal to a processor corresponding to the measured bandwidth, and transmitting another signal to the deformable third reflecting surface corresponding to a selected surface contour adjustment, such as in a feedback arrangement.

INCORPORATION BY REFERENCE

What follows is a cite list of references which are, in addition to those references cited above and below, including that which is described as background, the above invention summary and the abstract below, are hereby incorporated by reference into the detailed description of the preferred embodiment below, as disclosing alternative embodiments of elements or features of the preferred embodiments not otherwise set forth in detail below. A single one or a combination of two or more of these references may be consulted to obtain a variation of the preferred embodiments described in the detailed description below. Further patent, patent application and non-patent references are cited in the written description and are also incorporated by reference into the detailed description of the preferred embodiment with the same effect as just described with respect to the following references:

German Patent no. P 40 29 687.3-33 (Sep. 19, 1990), P. Lokai et al.;

U.S. Pat. Nos. 5,095,492, 5,970,082, 6,094,448, 6,061, 382, 6,028,879, 6,061,129, 5,978,409, 5,946,337, 6,285,701, 6,240,110, 6,163,559 and 6,154,470;

German utility model no. 298 22 090.3 (Feb. 2, 1999), J. Kleinschmidt, P. Heist, H. S. Albrecht;

R. K. Tyson, Principles of Adaptive Optics, Academic Press, 1991

N. Tan-No et al. IEEE J.QE-16 (1980), 147;

M. D. Levenson et al. JOSA 71 (1981), 737;

H. H. Barrett and S. F. Jacobs, Opt. Lett. 4 (1979), 190;

H. S. Albrecht, P. Heist, J. Kleinschmidt, Laser for generating narrow band radiation, Gebrauchsmusteranmeldung, 1999

U.S. patent application Ser. Nos. 09/452,353, 60/235,116, 09/317,695, 09/244,554, 09/602,409, 09/599,130, 09/598, 552, 09/629,256, 09/769,019, 09/791,496, 09/771,366, 09/738,849, 09/715,803, 09/718,809, 09/712,367, 09/843, 604, 09/883,127, 09/900,703, 09/775,778, 09/791,431, 09/694,246, 60/280,398, 60/212,257, 60/244,744, 60/242, 602, 60/267,567, 60/281,433, 60/296,947, 60/309,939 and 09/776,589, which are assigned to the same assignee as the present application; and German utility model no. 298 22 082.2 (Feb. 2, 1999), J. Kleinschmidt;

German Patent publications DE 298 22 090, DE 298 22 082, and DE 42 25 781; and

PCT published application no. WO 01/18923 A1.

DETAILED DESCRIPTION OF THE PREFERRED EMBODIMENTS

Figure 1:
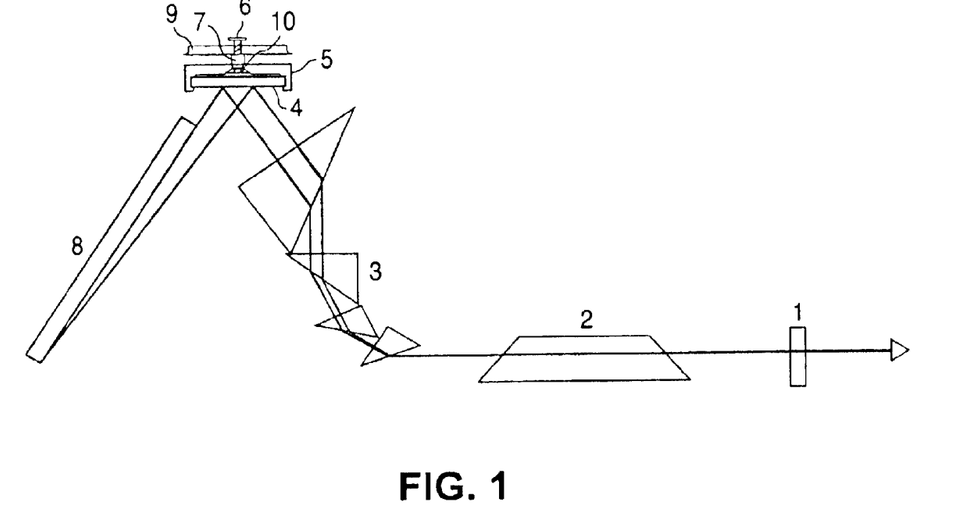
FIG. 1 schematically illustrates a resonator arrangement including a folding mirror assembly according to a preferred embodiment.

Resonator arrangements for regulating or controlling the spectral bandwidth of an excimer or molecular fluorine laser system are set forth as preferred embodiments below. FIG. 1 schematically shows a preferred embodiment of such a bi-directional bandwidth controlled resonator arrangement for a narrow band excimer or molecular fluorine laser contemplated for use, e.g., in photolithography. Referring to FIG. 1, the preferred resonator design includes an output coupler 1 as a first of a pair of resonator reflectors. The output coupler 1 shown is a partially reflective mirror, wherein alternative output couplers may reflectively output couple the beam or may have interferometric properties for further line-narrowing the beam such as an etalon or an interferometric device having non-parallel opposed reflecting plates. The design shown in FIG. 1 includes the laser tube 2 itself which is filled with a gas mixture including molecular fluorine and a buffer gas for rare gas fluoride excimer lasers and for molecular fluorine lasers, wherein the rare gas fluoride lasers include an additional active are gas such as argon for the argon fluoride laser and krypton for the krypton fluoride laser.

The resonator of FIG. 1 also includes a beam expander 3. The beam expander 3 may include one or more beam expansion prisms, e.g., two or three, or even four (or more) prisms as shown in FIG. 1. The beam expander 3 may include a pair of lenses or one or more reflective components for expanding and reducing the divergence of the beam. The beam expander 3 functions to magnify the beam. Other beam expanders may include a single or multi-prism beam expander including any number of prisms (not so many that the beam is attenuated too much) or other refractive elements such as a pair of lenses. The beam expander 3 increases the size of the beam profile in the plane including the apex angles of the prisms of the beam expander 3. The beam expander 3 thus prepares the beam for enhanced dispersion when it reaches the dispersion element 8, e.g., a preferred grating or alternative dispersive prism or prisms.

A folding mirror 4 is disposed in the resonator after the beam expander 3. the folding mirror 4 is part of a component of the resonator that provides wavefront compensation because the folding mirror 4 can have its surface contour adjusted to be more or less concave, and the surface contour may be cylindrical, spherical, aspherical, toriqual or any of a wide variety of shapes. The adjustability can be such that the surface contour of the folding mirror 4 can be adjusted until the bandwidth is minimized. As such, the component that includes the folding mirror 4 which has an adjustable reflecting surface contour also includes one or more endplates coupled with and/or bonded to the folding mirror 4. An adjustable spindle 6 is also shown along with a spring 7 and a plate or wall having the spindle 6 disposed therethrough, as well as a spherical nut 10. These particular features of the deformable folding mirror 4 shown and described in more detail in FIG. 2.

The deformable mirror 4 may have a cylindrical, spherical, toriqual, aspherical or other curved contour reflecting surface. As such, the mirror 4 preferably has an adjustable radius of curvature. The mirror 4 may also have a convex or concave dome shape, wherein only a limited length of the reflecting surface of the mirror 4 has an adjustable curvature. The contour of the reflecting surface of the mirror 4 may be more complex, i.e., being described at least in a first plane by the formula $y=a+bx+cx^2+dx^3+\ldots$, where each of the coefficients may be any real number or zero, and preferably at least one higher order coefficient is non-zero. A different or no curvature may exist in the orthogonal plane, or the surface contour may be interdependently three-dimensional.

An excimer or molecular fluorine laser system may be provided with this resonator design preferably including a discharge chamber filled with a gas mixture including at least a halogen-containing molecular species and a buffer gas, multiple electrodes within the discharge chamber and connected to a pulsed power supply circuit for energizing the gas mixture and a resonator for generating an output beam including the discharge chamber and resonator reflecting surfaces at either end. The system preferably further includes an intracavity optic for narrowing a bandwidth of the output beam and configured to magnify the beam in a first and a second orthogonal cross-sectional beam axis directions for suppressing fluctuations in one or more output beam parameters, and particularly for stabilizing the bandwidth around a selected, and preferably minimized, value.

In an alternative embodiment, the folding mirror 4 may be fixed, while a mirror of a reflective beam expander, such as that described at U.S. Pat. No. 6,163,559, incorporated by reference above, includes an adjustable surface contour, particularly the final mirror (e.g., mirror 12 of FIGS. 2 and 5 of the '559 patent) before the dispersive element 8. This alternative embodiment may or may not include the folding mirror 8, such that the line-narrowing unit may be arranged in Littrow configuration (w/o folding mirror) or Littman configuration (w/folding mirror), while advantageously having adjustable wavefront compensation in either case.

The resonator design of FIG. 1 further includes a dispersive element 8 such as preferably a grating, or alternatively one or more dispersive prisms, and alternatively or in addition, an interferometric device such as an etalon or a device including non-parallel reflecting plates such as that described at U.S. patent application Ser. Nos. 09/715,803 and 60/280,398, which are assigned to the same assignee as the present application and are hereby incorporated by reference, may be included in the resonator particularly positioned after one or more of the prisms or other optics of the beam expander or as an output coupler in place of the partially reflecting mirror 1 shown in FIG. 1. The grating 8 may be such as that described at any of U.S. patent application Ser. Nos. 09/712,367, 09/771,366, 09/602,184 (as a surface of a grism component, see also Ser. No. 09/738,849) and Ser. No. 09/599,130 (in an oscillator-amplifier configuration for a $F_2$ laser), which applications are assigned to the same assignee as the present application and are hereby incorporated by reference.

By bending the folding mirror 4, wavefront distortions can be corrected in front of the grating 8 and the laser bandwidth may in this way be reduced. In a preferred configuration of the assembly including the adjustable folding mirror 4, and referring to FIG. 2, a fine adjustment spindle 6 is disposed through a wall 9 and extends to the end plates 5. A spherical nut 10 is movable on the end of the spindle 6. The lined surface of the folding mirror 4 can be made more concave (or less convex) by screwing the fine spindle 6 in a direction out of the mirror 4 compressing the springs 7 to pull the end plates 5 toward the wall 9. The mirror surface 4 can be made more convex (or less concave) by screwing the fine spindle 6 in an opposite direction. The laser wavelength could be tuned by turning one of the prisms in the beam expander 3 or turning the grating 8. The screwing of the fine spindle 6 and/or turning of the grating or prism is preferably automatically performed by processor-controlled automatic motor drivers, although manual control may be performed. A substantially improvement in excimer or molecular fluorine laser bandwidth control by fine adjustable curvature of the folding mirror 4 is advantageously achieved according to the embodiments shown at FIGS. 1 and 2.

Use of a grating 8 and prism beam expander 3 for narrowing the bandwidth of an excimer laser output beam is an advantageous technique (see, e.g., Lokai et al. German Patent no. P 40 29 687.3-33). In U.S. Pat. Nos. 5,095,492, 5,970,082 and 6,094,448 are described techniques for bending of the grating to improve the laser bandwidth, and U.S. patent application Ser. No. 09/452,353 describes a bendable mirror for improving bandwidth and bandwidth control and/or for adjusting and controlling the wavelength. All of these patent documents are hereby incorporated by reference.

According to a preferred embodiment, a fixed folding mirror system, including the deformable folding mirror 4, is included in the narrow bandwidth resonator (see FIG. 1) and provides bi-directional laser bandwidth control with substantially reduction of the full-width at half-maximum (FWHM) of the laser output beam, or an improvement in spectral purity. The laser wavelength is in this arrangement may be tuned by pivoting one or more of the prisms of the beam expander 3 or the grating 8 or by pressure tuning (see U.S. patent application Ser. Nos. 09/244,554 and 09/771, 366, which are assigned to the same assignee as the present application, and U.S. Pat. No. 6,154,470, which are all incorporated by reference.

Figure 2:
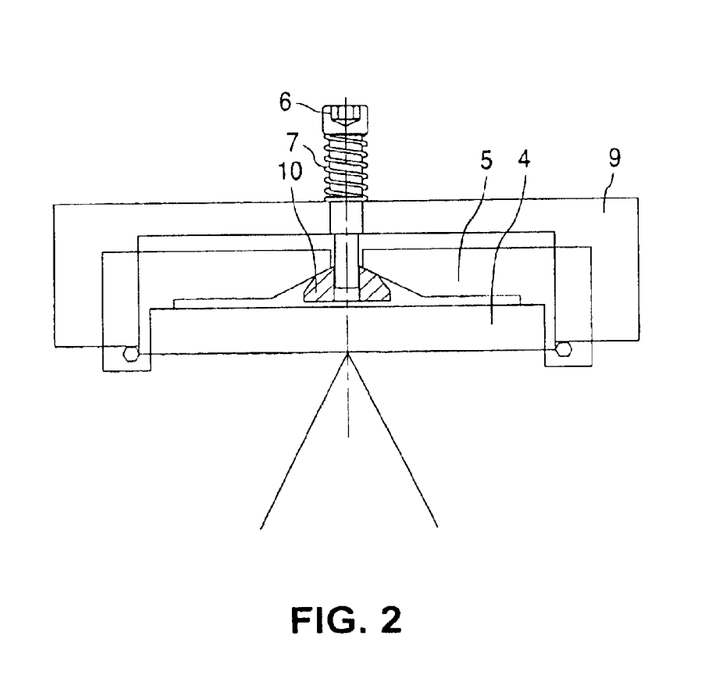
FIG. 2 schematically illustrates a folding mirror assembly according to a preferred embodiment.

The preferred resonator arrangement may be part of any of a wide variety of tunable laser systems such as excimer lasers, $F_2$ lasers, dye lasers, Ti:sapphire lasers, optical parametric oscillators, alexandrite lasers and other tunable solid-state lasers, as well potentially to EUV exposure radiation sources that may be developed for use in optical lithography systems. FIGS. 1 and 2 show the basic elements of a laser resonator having bi-directional control of the laser bandwidth according to a preferred embodiment. Broadband laser light (e.g., 193 nm or 248 nm or 157 nm) is initially generated in the discharge chamber 2 shown in FIG. 1. The broadband radiation passing through beam expander 3 is reflected by the folding mirror 4 to the grating 8. Only a particular band of the wavelengths will be reflected exactly back on itself (Littrow or Littman arrangements), amplified in the discharge chamber 2 and passed through the partial reflectivity outcoupler 1. Pivoting the grating 8 or one or more of the prisms in the beam expander 3 permits wavelength tuning in the broadband laser emission spectrum.

Due to imperfections in the resonator optics, the wavefront in front of the grating 8 may be more or less degraded. Bending (adjusting a radius of curvature between 102 to 103 m, e.g.) the folding mirror 4 can provide correction of these wavefront distortions in front of the grating 8 and consequently reduce the laser bandwidth. The fine adjustment spindle 6 disposed through the wall 9 and extending to the end plates 5 bonded on the mirror 4 may be used to make a surface contour adjustment of the folding mirror 4 to match the wavefront to the surface contour of the grating 8. The spherical nut 10 on one end of the adjust spindle 6 may be moved up and/or down by turning this spindle 6. The lined surface of the folding mirror 4 can be made more concave (or less convex) by screwing the fine spindle 6 in a direction out of the mirror 4 compressing the springs to pull the end plates 5 toward the wall 9. The mirror surface 4 can also be made more convex (or less concave) by screwing the fine spindle 6 in an opposite direction. Using a motorized spindle 6, the bandwidth can be actively controlled during laser operation, such as including use of a processor and a wavelength and/or bandwidth detector such as a spectrometer including a grating or etalon, in a feedback arrangement with the spindle 6 to adjust the deformable mirror 4.

Generally, a driving element is used for adjusting the surface contour of the mirror 4. One such driving element that may be used in accord with the preferred embodiment to achieve a mirror 4 having an adjustable surface contour or radius of curvature is shown in FIG. 2, although many alternative embodiments are possible. For example, a piezo may be connected to the back of the mirror (see the Ser. No. 09/452,353 application, incorporated by reference above). The piezo may be crystal, ceramic or polymer-based. The piezo applies pressure to the center of the back of the mirror in an amount that depends on the electromagnetic energy supplied to the piezo by a control unit. Alternatively, multiple piezos may be disposed around the periphery of the back of the mirror. This control unit, which may be used with the preferred embodiment including the spindle 6 arrangement or other alternative embodiments, would also preferably receive linewidth, bandwidth or spectral purity information from a spectrometer, and preferably through a processor in a feedback arrangement, as described in more detail below, wherein the spectrometer measures the linewidth, etc., of a split off portion of the main beam. A beam splitter may be used for this purpose. The control unit may control the piezo or spindle 6 or other surface contour adjusting device based on the linewidth, etc. information the control unit receives from the spectrometer or processor, and selected bandwidth information. The control unit may itself by the processor or may communicate with the processor.

An alternative arrangement including an alternative driving element configuration for the deformable mirror 4, which may be a modification or embellishment of the preferred embodiment shown at FIG. 2, includes a motor used to drive a screw to adjust the deformation of the mirror 4. The mirror 4 is contacted preferably at or near its center by one end of the screw. The other end of the screw is contacted and turned using torque produced by the motor. The threads of the screw work in a base having a through hole that is internally threaded. The back of the mirror 4 is also contacted away from its center where the screw contacts the back of the mirror 4.

Preferably, if the mirror 4 is a cylindrical one, or at least has cylindrical radius of curvature adjustable, then a pair of substantially straight components contact the back of the mirror collinearly with the curvilinear axis of the mirror 4. If the mirror is a spherical one, or at least has spherical or aspherical radius of curvature adjustability, then a substantially circular component or multiple localized components may contact the back of the mirror, wherein the screw may contact the back of the mirror 4 at the center of the circular component, or multiple screws may contact the mirror 4 such as may each have a spheical nut 10 or similar component. In general, as the screw or screws is/are turned, the center of the mirror 4 moves relative to the outer portions of the mirror causing the radius of curvature of the mirror 4 to change.

There are many varieties of ways to alternatively deform the resonator reflector 4. For example, that which is taught at any of U.S. Pat. Nos. 5,095,492, 5,970,082 and 6,094,448 for adjusting a grating curvature of a very narrow band (i.e., <1 pm) excimer laser used with a refractive optical imaging system for photolithography is hereby incorporated by reference into the present application as disclosing alternative methods for adjusting the mirror 4.

Other driving elements for producing the desired deformation of the mirror 4 may include a magnetic element or an electrostatic condenser, again preferably located at the back of the mirror 4. In the magnetic element embodiment, a portion of the mirror may be magnetic, and the magnetization of the magnetic element may be adjusted. A magnetic element such as is known to be used in a dynamic moving coil or ribbon, a moving armature, or magneto-restrictive arrangement of a loudspeaker may be used. An electrostatic driving element may be used, such as including a condenser, as is also known in the loudspeaker art. Further, the mirror 4 may comprise a diaphragm with a highly reflecting surface. Such a diaphragm is known, e.g., in the loudspeaker arts to have an adjustable surface contour. Some metallic reflecting materials used with loudspeaker arrangements having adjustable diaphragms include boron, berylium, aluminum and titanium.

The radius of curvature of the mirror 4 may be adjusted by sealing the bendable mirror 4 at an opening of a pressure-regulated enclosure. Reducing the pressure within the enclosure would cause the concavity to increase, or the radius of curvature of the mirror 4 to decrease if it is initially convex-shaped. Increasing the pressure would have the opposite effect. Thus, by controlling the pressure in the enclosure, the radius of curvature of the mirror 4 may be controlled.

Figure 3:
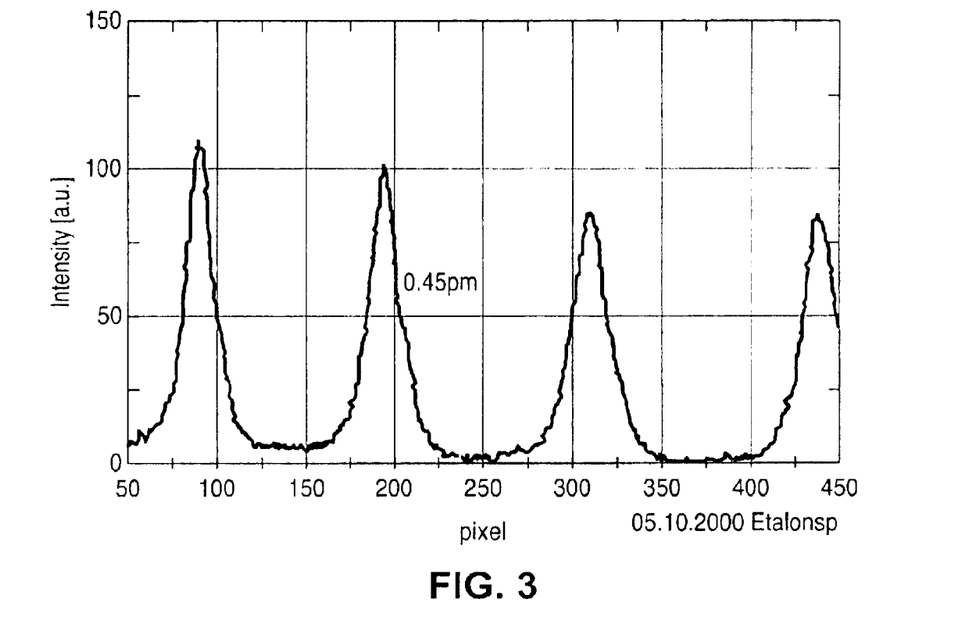
FIG. 3 shows an interference spectrum having lines with linewidths corresponding to the bandwidth of measured radiation for an ArF Laser emitting around 193.368 nm and including a resonator arrangement including a flat folding mirror.
Figure 4:
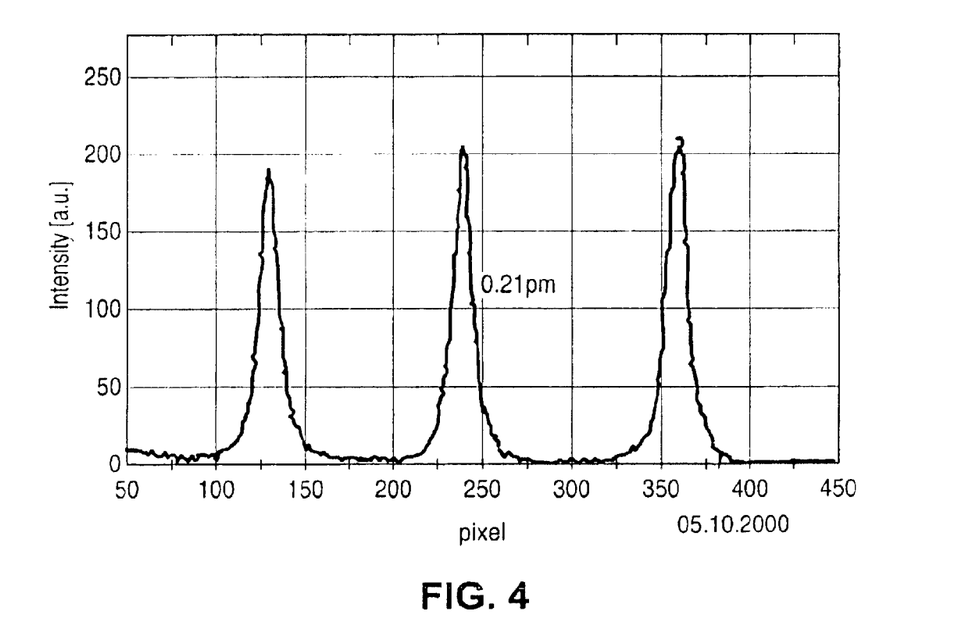
FIG. 4 shows an interference spectrum having lines with linewidths corresponding to the bandwidth of measured radiation for an ArF Laser emitting around 193.368 nm and including a resonator arrangement including a curved folding mirror according to a preferred embodiment.

FIGS. 3 and 4 demonstrate improvement of the bandwidth using fine adjustment of the curvature of the mirror 4. In both cases, the same monitor etalon was used to detect the bandwidth. Since the bandwidth is proportional to the geometric width of the interference fringes on the array detector disposed after the monitor etalon, the bandwidth of the beam is observed to have been narrower for the system configuration corresponding to FIG. 4 than for that corresponding to FIG. 3. The difference is that the curvature of the folding mirror 4 was adjusted to more closely match the wavefront of the beam incident at the grating 8 with the surface contour of the grating 8 in the configuration corresponding to FIG. 4 than for that corresponding to FIG. 3.

The dispersion element 8, such as a grating or one or more dispersive prisms disperses the beam already expanded by the beam expander 3, and transforms the beam into one having wavelength dependence on lateral position within the beam, or in the direction of beam expansion, or in the plane of the apex angles of each of the prisms of the beam expander 3. Line narrowing occurs due to the dispersive element 8 because those portions of the beam outside the acceptance angle of the resonator are not included in the output emission laser beam of the system. Thus, only a narrowed band of wavelengths remains within the acceptance angle of the resonator after the dispersive element 8, together with the beam expander 3, transform the resonating beam. A grating is preferably used especially when enhanced line-narrowing is desired. One or more etalons or other interferometric devices can also be used for further line narrowing and/or line selection. The prisms of the beam expander 3 may comprise fused silica, calcium fluoride or a combination of these materials, although particularly for the molecular fluorine laser and also for the ArF laser, preferably $CaF_2$ is advantageously used and not fused silica.

As mentioned briefly above, a spectral parameter such as the wavelength, bandwidth, linewidth, spectral purity, etc., may be monitored by a spectrometer, such as may be part of the diagnostic module 118 described below with reference to FIG. 5. The spectral parameter may be controlled by adjusting one or more op[tics of the resonator, e.g, rotating the dispersive element 8 or one or more prisms of the beam expander or by pressure tuning, or by adjusting the surface contour of the mirror 4, etc. The energy may also be monitored by the spectrometer or other detector device for energy detection such as a photodiode. The energy may be controlled by controlling the energy of electrical pulses applied to the discharge electrodes of a discharge circuit 104 (see FIG. 5), and/or by controlling the gas supply in the laser tube.

Overall Laser System

Figure 5:
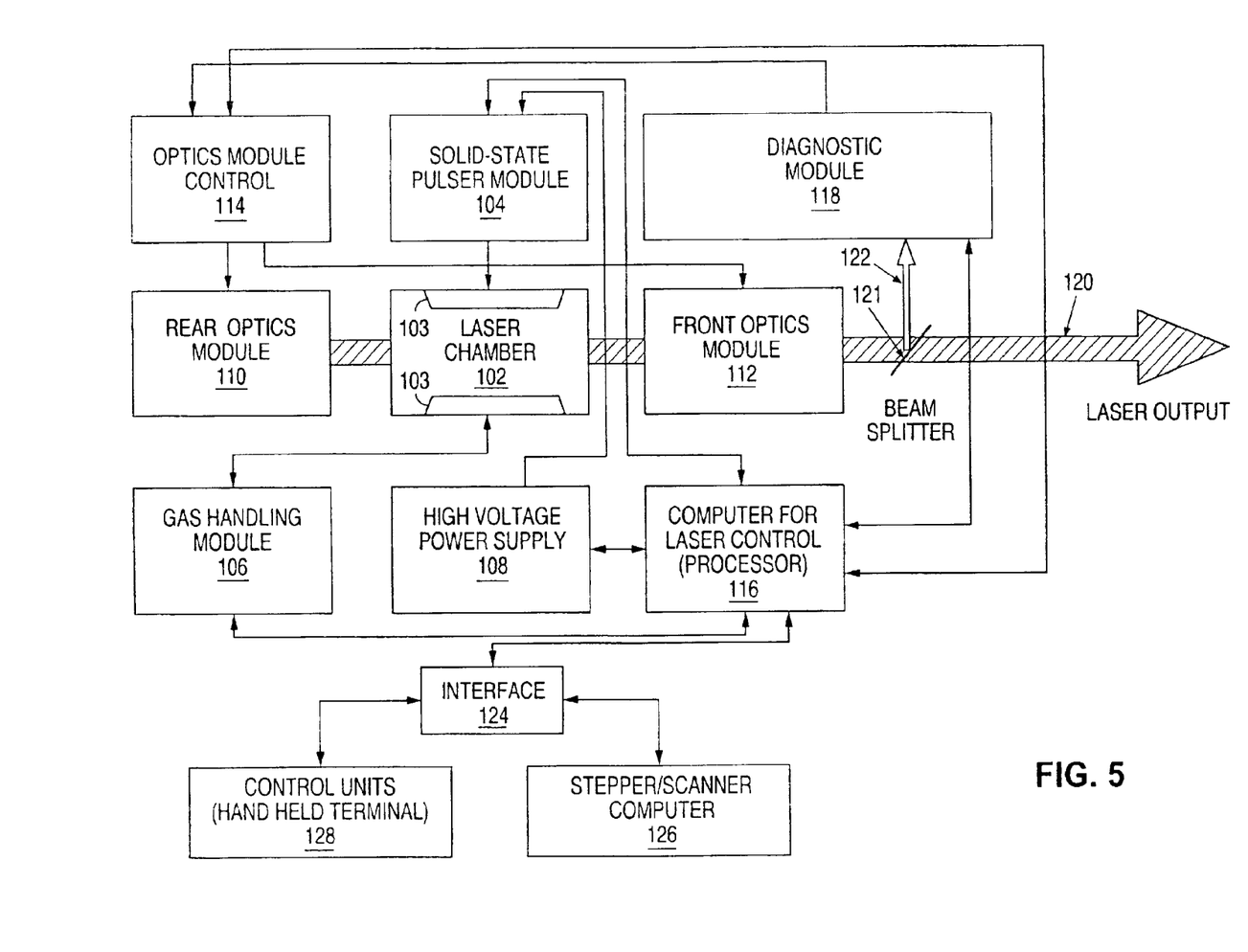
FIG. 5 schematically illustrates an excimer or molecular fluorine laser system according to a preferred embodiment.

FIG. 5 schematically illustrates an overall excimer or molecular fluorine laser system according to a preferred embodiment which preferably includes the advantageous features described above with reference to FIGS. 1–4. Referring to FIG. 5, a preferred excimer or molecular fluorine laser system is a DUV or VUV laser system, such as a KrF, ArF or molecular fluorine ($F_2$) laser system, for use with a deep ultraviolet (DUV) or vacuum ultraviolet (VUV) lithography system. Alternative configurations for laser systems for use in such other industrial applications as TFT annealing, photoablation and/or micromachining, e.g., include configurations understood by those skilled in the art as being similar to and/or modified from the system shown in FIG. 5 to meet the requirements of that application. Alternative configurations for producing lithographic exposure radiation at EUV wavelengths (e.g., between 11 nm and 15 nm) may be described at U.S. patent application Ser. Nos. 60/281,446 and 60/312,277, which are assigned to the same assignee as the present application, and at any of the multiple references cited in those applications, all of which are hereby incorporated by reference. Alternative DUV or VUV laser system and component configurations may be described at U.S. patent application Ser. Nos. 09/317,695, 09/244,554, 09/452,353, 09/512,417, 09/599,130, 09/694, 246, 09/712,877, 09/574,921, 09/738,849, 09/718,809, 09/629,256, 09/712,367, 09/771,366, 09/715,803, 09/738, 849, 09/791,431, 60/204,095, 09/741,465, 09/574,921, 09/734,459, 09/741,465, 09/686,483, 09/584,420, 09/843, 604, 09/780,120, 09/792,622, 09/791,431, 09/811,354, 09/838,715, 09/715,803, 09/717,757, 09/771,013, 09/791, 430, 09/712,367 and 09/780,124, and U.S. Pat. Nos. 6,285, 701, 6,005,880, 6,061,382, 6,020,723, 6,219,368, 6,212,214, 6,154,470, 6,157,662, 6,243,405, 6,243,406, 6,198,761, 5,946,337, 6,014,206, 6,157,662, 6,154,470, 6,160,831, 6,160,832, 5,559,816, 4,611,270, 5,761,236, 6,212,214, 6,243,405, 6,154,470, and 6,157,662, each of which is assigned to the same assignee as the present application and is hereby incorporated by reference.

Discharge Tube

The system shown in FIG. 5 generally includes a laser chamber 102 (or laser tube including a heat exchanger and fan for circulating a gas mixture within the chamber 102 or tube) having a pair of main discharge electrodes 103 connected with a solid-state pulser module 104, and a gas handling module 106. The gas handling module 106 has a valve connection to the laser chamber 102 so that halogen, any active rare gases and a buffer gas or buffer gases, and optionally a gas additive, may be injected or filled into the laser chamber, preferably in premixed forms (see U.S. patent application Ser. Nos. 09/513,025, 09/780,120, 09/734,459 and 09/447,882, which are assigned to the same assignee as the present application, and U.S. Pat. Nos. 4,977,573, 4,393, 505 and 6,157,662, which are each hereby incorporated by reference. The solid-state pulser module 104 is powered by a high voltage power supply 108. A thyratron pulser module may alternatively be used. The laser chamber 102 is surrounded by optics module 110 and optics module 112, forming a resonator. The optics modules 110 and 112 may be controlled by an optics control module 114, or may be alternatively directly controlled by a computer or processor 116, particular when line-narrowing optics are included in one or both of the optics modules 110, 112, such as is preferred when KrF, ArF or $F_2$ lasers are used for optical lithography.

Processor Control

The processor 116 for laser control receives various inputs and controls various operating parameters of the system. A diagnostic module 118 receives and measures one or more parameters, such as pulse energy, average energy and/or power, and preferably wavelength, of a split off portion of the main beam 120 via optics for deflecting a small portion 122 of the beam toward the module 118, such as preferably a beam splitter module 121. The beam 120 is preferably the laser output to an imaging system (not shown) and ultimately to a workpiece (also not shown) such as particularly for lithographic applications, and may be output directly to an application process. The laser control computer 116 may communicate through an interface 124 with a stepper/scanner computer, other control units 126, 128 and/or other external systems.

The processor or control computer 116 receives and processes values of some of the pulse shape, energy, ASE, energy stability, energy overshoot for burst mode operation, wavelength, spectral purity and/or bandwidth, among other input or output parameters of the laser system and output beam. The processor may receive signals corresponding to the wavefront compensation such as values of the bandwidth, and may control the wavefront compensation performed by the wavefront compensation optic 3, 13, 23 (see above) in a feedback loop by sending signals to adjust the pressure(s) and/or curvature(s) of surfaces associated with the wavefront compensation optic 3, 13, 23. The processor 116 also controls the line narrowing module to tune the wavelength and/or bandwidth or spectral purity, and controls the power supply and pulser module 104 and 108 to control preferably the moving average pulse power or energy, such that the energy dose at points on the workpiece is stabilized around a desired value. In addition, the computer 116 controls the gas handling module 106 which includes gas supply valves connected to various gas sources. Further functions of the processor 116 such as to provide overshoot control, energy stability control and/or to monitor input energy to the discharge, are described in more detail at U.S. patent application Ser. No. 09/588,561, which is assigned to the same assignee and is hereby incorporated by reference.

As shown in FIG. 5, the processor 116 preferably communicates with the solid-state or thyratron pulser module 104 and HV power supply 108, separately or in combination, the gas handling module 106, the optics modules 110 and/or 112, the diagnostic module 118, and an interface 124. The laser resonator which surrounds the laser chamber 102 containing the laser gas mixture includes optics module 110 including line-narrowing optics for a line narrowed excimer or molecular fluorine laser, which may be replaced by a high reflectivity mirror or the like in a laser system wherein either line-narrowing is not desired, or if line narrowing is performed at the front optics module 112, or a spectral filter external to the resonator is used for narrowing the linewidth of the output beam.

Solid State Pulser Module

The laser chamber 102 contains a laser gas mixture and includes one or more preionization units (not shown) in addition to the pair of main discharge electrodes 103. Preferred main electrodes 103 are described at U.S. patent application Ser. No. 09/453,670 for photolithographic applications, which is assigned to the same assignee as the present application and is hereby incorporated by reference, and may be alternatively configured, e.g., when a narrow discharge width is not preferred. Other electrode configurations are set forth at U.S. Pat. Nos. 5,729,565 and 4,860,300, each of which is assigned to the same assignee, and alternative embodiments are set forth at U.S. Pat. Nos. 4,691,322, 5,535,233 and 5,557,629, all of which are hereby incorporated by reference. Preferred preionization units may be sliding surface or corona-type and are described U.S. patent application Ser. Nos. 09/922,241 and 09/532,276 (sliding surface) and Ser. Nos. 09/692,265 and 09/247,887 (corona discharge), each of which is assigned to the same assignee as the present application, and additional alternative embodiments are set forth at U.S. Pat. Nos. 5,337,330, 5,818,865, 5,875,207 and 5,991,324, and German Gebrauchsmuster DE 295 21 572 U1, all of the above patents and patent applications being hereby incorporated by reference.

The solid-state or thyratron pulser module 104 and high voltage power supply 108 supply electrical energy in compressed electrical pulses to the preionization and main electrodes 103 within the laser chamber 102 to energize the gas mixture. Components of the preferred pulser module and high voltage power supply are described above, and further details may be described at U.S. patent application Ser. Nos. 09/640,595, 09/838,715, 60/204,095, 09/432,348 and 09/390,146, and U.S. Pat. Nos. 6,005,880, 6,226,307 and 6,020,723, each of which is assigned to the same assignee as the present application and which is hereby incorporated by reference into the present application. Other alternative pulser modules are described at U.S. Pat. Nos. 5,982,800, 5,982,795, 5,940,421, 5,914,974, 5,949,806, 5,936,988, 6,028,872, 6,151,346 and 5,729,562, each of which is hereby incorporated by reference.

Resonator, General

The laser resonator which surrounds the laser chamber 102 containing the laser gas mixture includes optics module 110 preferably including line-narrowing optics for a line narrowed excimer or molecular fluorine laser such as for photolithography, which may be replaced by a high reflectivity mirror or the like in a laser system wherein either line-narrowing is not desired (for TFT annealling, e.g.), or if line narrowing is performed at the front optics module 112, or a spectral filter external to the resonator is used, or if the line-narrowing optics are disposed in front of the HR mirror, for narrowing the bandwidth of the output beam. For an $F_2$-laser, optics for selecting one of multiple lines around 157 nm may be used, e.g., one or more dispersive prisms, birefringent plates or blocks and/or an interferometric device such as an etalon or a device having a pair of opposed, non-parallel plates such as described in the Ser. Nos. 09/715,803 and No. 60/280,398 applications, wherein the same optic or optics or an additional line-narrowing optic or optics for narrowing the selected line may be used. Also, particularly for the $F_2$-laser, and also possibly for other excimer lasers, the total gas mixture pressure may be lower than conventional systems, e.g., lower than 3 bar, for producing the selected line at a narrow bandwidth such as 0.5 pm or less without using additional line-narrowing optics (see U.S. patent application Ser. No. 60/212,301, which is assigned to the same assignee as the present application and is hereby incorporated by reference).

The laser chamber 102 is sealed by windows transparent to the wavelengths of the emitted laser radiation 120. The windows may be Brewster windows or may be aligned at another angle, e.g., 5°, to the optical path of the resonating beam. One of the windows may also serve to output couple the beam or as a highly reflective resonator reflector on the opposite side of the chamber 102 as the beam is outcoupled.

Diagnostic Module

After a portion of the output beam 120 passes the outcoupler of the optics module 112, that output portion preferably impinges upon a beam splitter module 121 which includes optics for deflecting a portion 122 of the beam to the diagnostic module 118, or otherwise allowing a small portion 122 of the outcoupled beam to reach the diagnostic module 118, while a main beam portion 120 is allowed to continue as the output beam 120 of the laser system (see U.S. patent application Ser. Nos. 09/771,013, 09/598,552, and 09/712,877 which are assigned to the same assignee as the present invention, and U.S. Pat. No. 4,611,270, each of which is hereby incorporated by reference. Preferred optics include a beamsplitter or otherwise partially reflecting surface optic. The optics may also include a mirror or beam splitter as a second reflecting optic. More than one beam splitter and/or HR mirror(s), and/or dichroic mirror(s) may be used to direct portions of the beam to components of the diagnostic module 118. A holographic beam sampler, transmission grating, partially transmissive reflection diffraction grating, grism, prism or other refractive, dispersive and/or transmissive optic or optics may also be used to separate a small beam portion from the main beam 120 for detection at the diagnostic module 118, while allowing most of the main beam 120 to reach an application process directly or via an imaging system or otherwise. These optics or additional optics may be used to filter out visible radiation such as the red emission from atomic fluorine in the gas mixture from the split off beam prior to detection.

The output beam 120 may be transmitted at the beam splitter module while a reflected beam portion is directed at the diagnostic module 118, or the main beam 120 may be reflected, while a small portion is transmitted to the diagnostic module 118. The portion of the outcoupled beam which continues past the beam splitter module 121 is the output beam 120 of the laser, which propagates toward an industrial or experimental application such as an imaging system and workpiece for photolithographic applications.

The diagnostic module 118 preferably includes at least one energy detector. This detector measures the total energy of the beam portion that corresponds directly to the energy of the output beam 120 (see U.S. Pat. Nos. 4,611,270 and 6,212,214 which are hereby incorporated by reference). An optical configuration such as an optical attenuator, e.g., a plate or a coating, or other optics may be formed on or near the detector or beam splitter module 121 to control the intensity, spectral distribution and/or other parameters of the radiation impinging upon the detector (see U.S. patent application Ser. Nos. 09/172,805, 09/741,465, 09/712,877, 09/771,013 and 09/771,366, each of which is assigned to the same assignee as the present application and is hereby incorporated by reference).

One other component of the diagnostic module 118 is preferably a wavelength and/or bandwidth detection component such as a monitor etalon or grating spectrometer, and a hollow cathode lamp or reference light source for providing absolute wavelength calibration of the monitor etalon or grating spectrometer (see U.S. patent application Ser. Nos. 09/416,344, 09/686,483, and 09/791,431, each of which is assigned to the same assignee as the present application, and U.S. Pat. Nos. 4,905,243, 5,978,391, 5,450,207, 4,926,428, 5,748,346, 5,025,445, 6,160,832, 6,160,831, 6,269,110, 6,272,158 and 5,978,394, all of the above wavelength and/or bandwidth detection and monitoring components being hereby incorporated by reference). The bandwidth and/or wavelength or other spectral, energy or other beam parameter may be monitored and controlled in a feedback loop including the processor 116 and optics control modules 110, 112, gas handling module 106, power supply and pulser modules 103, 104, or other laser system component modules. For example, the total pressure of the gas mixture in the laser tube 102 may be controlled to a particular value for producing an output beam at a particular bandwidth and/or energy.

Other components of the diagnostic module may include a pulse shape detector or ASE detector, such as are described at U.S. Pat. Nos. 6,243,405 and 6,243,406 and U.S. patent application Ser. No. 09/842,281, which is assigned to the same assignee as the present application, each of which are hereby incorporated by reference, such as for gas control and/or output beam energy stabilization, or to monitor the amount of amplified spontaneous emission (ASE) within the beam to ensure that the ASE remains below a predetermined level. There may be a beam alignment monitor, e.g., such as is described at U.S. Pat. No. 6,014,206, or beam profile monitor, e.g., U.S. patent application Ser. No. 09/780,124, which is assigned to the same assignee, wherein each of these patent documents is hereby incorporated by reference.

Beam Path Enclosure

Particularly for the molecular fluorine laser system, and also for the ArF and KrF laser systems, an enclosure (not shown) preferably seals the beam path of the beam 120 such as to keep the beam path free of photoabsorbing or other contaminant species that can tend to attenuate and/or otherwise disturb the beam such as by providing a varying refractive index along the optical path of the beam. Smaller enclosures preferably seal the beam path between the chamber 102 and the optics modules 110 and 112 and between the beam splitter 122 and the diagnostic module 118 (see the Ser. Nos. 09/317,695, 09/594,892 and 09/598,552 applications, incorporated by reference above). The optics modules 110 and 112 are maintained in an atmosphere that is sufficiently evacuated or have an inert gas purged atmosphere. Preferred enclosures are described in detail in U.S. patent application Ser. Nos. 09/598,552, 09/594,892, 09/727,600, 09/317,695 and 09/131,580, which are assigned to the same assignee and are hereby incorporated by reference, and U.S. Pat. Nos. 6,219,368, 5,559,584, 5,221,823, 5,763,855, 5,811,753 and 4,616,908, all of which are hereby incorporated by reference.

Gas Mixture

The laser gas mixture is initially filled into the laser chamber 102 in a process referred to herein as a "new fills". In such procedure, the laser tube is evacuated of laser gases and contaminants, and re-filled with an ideal gas composition of fresh gas. The gas composition for a very stable excimer or molecular fluorine laser in accord with the preferred embodiment uses helium or neon or a mixture of helium and neon as buffer gas(es), depending on the particular laser being used. Preferred gas compositions are described at U.S. Pat. Nos. 4,393,405, 6,157,162, 6,243,406 and 4,977,573 and U.S. patent application Ser. Nos. 09/513,025, 09/447,882, 09/789,120 and 09/588,561, each of which is assigned to the same assignee and is hereby incorporated by reference into the present application. The concentration of the fluorine in the gas mixture may range from 0.003% to 1.00%, and is preferably around 0.1%. An additional gas additive, such as a rare gas or otherwise, may be added for increased energy stability, overshoot control and/or as an attenuator as described in the Ser. No. 09/513,025 application incorporated by reference above. Specifically, for the $F_2$-laser, an addition of xenon, krypton and/or argon may be used. The concentration of xenon or argon in the mixture may range from 0.0001% to 0.1%. For an ArF-laser, an addition of xenon or krypton may be used also having a concentration between 0.0001% to 0.1%. For the KrF laser, an addition of xenon or argon may be used also having a concentration between 0.0001% to 0.1%. Gas replenishment actions are described below for gas mixture compositions of systems such as ArF, KrF, and XeCl excimer lasers and molecular fluorine lasers, wherein the ideas set forth herein may be advantageously incorporated into any of these systems, and other gas discharge laser systems.

Gas Replenishment

Halogen gas injections, including micro-halogen injections of, e.g., 1–3 milliliters of halogen gas, mixed with, e.g., 20–60 milliliters of buffer gas or a mixture of the halogen gas, the buffer gas and a active rare gas for rare gas-halide excimer lasers, per injection for a total gas volume in the laser tube 102 of, e.g., 100 liters, total pressure adjustments and gas replacement procedures may be performed using the gas handling module 106 preferably including a vacuum pump, a valve network and one or more gas compartments. The gas handling module 106 receives gas via gas lines connected to gas containers, tanks, canisters and/or bottles. Some preferred and alternative gas handling and/or replenishment procedures, other than as specifically described herein (see below), are described at U.S. Pat. Nos. 4,977,573, 6,212,214, 6,243,406 and 5,396,514 and U.S. patent application Ser. Nos. 09/447,882, 09/734,459, 09/513,025 and 09/588,561, each of which is assigned to the same assignee as the present application, and U.S. Pat. Nos. 5,978,406, 6,014,398 and 6,028,880, all of which are hereby incorporated by reference. A xenon gas or other gas additive supply may be included either internal or external to the laser system according to the '025 application, mentioned above.

Total pressure adjustments in the form of releases of gases or reduction of the total pressure within the laser tube 102 may also be performed. Total pressure adjustments may be followed by gas composition adjustments if it is determined that, e.g., other than the desired partial pressure of halogen gas is within the laser tube 102 after the total pressure adjustment. Total pressure adjustments may also be performed after gas replenishment actions, and may be performed in combination with smaller adjustments of the driving voltage to the discharge than would be made if no pressure adjustments were performed in combination.

Gas replacement procedures may be performed and may be referred to as partial, mini- or macro-gas replacement operations, or partial new fill operations, depending on the amount of gas replaced, e.g., anywhere from a few milliliters up to 50 liters or more, but less than a new fill, such as are set forth in the Ser. No. 09/734,459 application, incorporated by reference above. As an example, the gas handling unit 106 connected to the laser tube 102 either directly or through an additional valve assembly, such as may include a small compartment for regulating the amount of gas injected (see the '459 application), may include a gas line for injecting a premix A including 1% $F_2$:99% Ne or other buffer gas such as He, and another gas line for injecting a premix B including 1 % rare gas:99% buffer gas, for a rare gas-halide excimer laser, wherein for a $F_2$ laser premix B is not used. Another line may be used for injecting a gas additive or gas additive premix, or a gas additive may be added to premix A, premix B or a buffer gas. Another line may be used for total pressure additions or reductions, i.e., for flowing buffer gas into the laser tube or allowing some of the gas mixture in the tube to be released, possibly accompanying halogen injections for maintaining the halogen concentration. Thus, by injecting premix A (and premix B for rare gas-halide excimer lasers) into the tube 102 via the valve assembly, the fluorine concentration in the laser tube 102 may be replenished. Then, a certain amount of gas may be released corresponding to the amount that was injected to maintain the total pressure at a selected level. Additional gas lines and/or valves may be used for injecting additional gas mixtures. New fills, partial and mini gas replacements and gas injection procedures, e.g., enhanced and ordinary micro-halogen injections, such as between 1 milliliter or less and 3–10 milliliters, or more depending on the degree of stability desired, and any and all other gas replenishment actions are initiated and controlled by the processor 116 which controls valve assemblies of the gas handling unit 106 and the laser tube 102 based on various input information in a feedback loop. These gas replenishment procedures may be used in combination with gas circulation loops and/or window replacement procedures to achieve a laser system having an increased servicing interval for both the gas mixture and the laser tube windows.

Line Narrowing

A general description of the line-narrowing features of embodiments of the laser system particularly for use with photolithographic applications is provided here, followed by a listing of patent and patent applications being incorporated by reference as describing variations and features that may be used within the scope of the preferred embodiments herein for providing an output beam with a high spectral purity or bandwidth (e.g., below 1 pm and preferably 0.6 pm or less). These exemplary embodiments may be used along with the wavefront compensating optic 3, 13, 13 described above. For the $F_2$ laser, the optics may be used for selecting the primary line $\lambda_1$ only of multiple lines around 157 nm, or may be used to provide additional line narrowing as well as performing line-selection, or the resonator may include optics for line-selection and additional optics for line-narrowing of the selected line, and line-narrowing may be provided by controlling (i.e., reducing) the total pressure (see U.S. patent application Ser. No. 60/212,301, which is assigned to the same assignee and is hereby incorporated by reference). Line-narrowing of the broadband emission of the ArF and/or KrF lasers may be as set forth below.

Exemplary line-narrowing optics contained in the optics module 110 include a beam expander, an optional interferometric device such as an etalon or a device having a pair of opposed non-planar reflection plates such as may be described in the Ser. Nos. 09/715,803 or 60/280,398 applications, which are assigned to the same assignee as the present application and are hereby incorporated by reference, and a diffraction grating, and alternatively one or more dispersion prisms may be used, wherein the grating would produce a relatively higher degree of dispersion than the prisms although generally exhibiting somewhat lower efficiency than the dispersion prism or prisms, for a narrow band laser such as is used with a refractive or catadioptric optical lithography imaging system. As mentioned above, the front optics module may include line-narrowing optics such as may be described in any of the Ser. Nos. 09/715,803, 09/738,849, and 09/718,809 applications, each being assigned to the same assignee and hereby incorporated by reference.

Instead of having a retro-reflective grating in the rear optics module 110, the grating may be replaced with a highly reflective mirror, and a lower degree of dispersion may be produced by a dispersive prism, or a beam expander and an interferometric device such as an etalon or device having non-planar opposed plates may be used for line-selection and narrowing, or alternatively no line-narrowing or line-selection may be performed in the rear optics module 110. In the case of using an all-reflective imaging system, the laser may be configured for semi-narrow band operation such as having an output beam linewidth in excess of 0.5 pm, depending on the characteristic broadband bandwidth of the laser, such that additional line-narrowing of the selected line would not be used, either provided by optics or by reducing the total pressure in the laser tube.

The beam expander of the above exemplary line-narrowing optics of the optics module 110 preferably includes one or more prisms. The beam expander may include other beam expanding optics such as a lens assembly or a converging/diverging lens pair. The grating or a highly reflective mirror is preferably rotatable so that the wavelengths reflected into the acceptance angle of the resonator can be selected or tuned. Alternatively, the grating, or other optic or optics, or the entire line-narrowing module may be pressure tuned, such as is set forth in the Ser. No. 09/771,366 application and the U.S. Pat. No. 6,154,470 patent, each of which is assigned to the same assignee and is hereby incorporated by reference. The grating may be used both for dispersing the beam for achieving narrow bandwidths and also preferably for retroreflecting the beam back toward the laser tube. Alternatively, a highly reflective mirror is positioned after the grating which receives a reflection from the grating and reflects the beam back toward the grating in a Littman configuration, or the grating may be a transmission grating. One or more dispersive prisms may also be used, and more than one etalon or other interferometric device may be used.

Depending on the type and extent of line-narrowing and/or selection and tuning that is desired, and the particular laser that the line-narrowing optics are to be installed into, there are many alternative optical configurations that may be used. For this purpose, those shown in U.S. Pat. Nos. 4,399,540, 4,905,243, 5,226,050, 5,559,816, 5,659,419, 5,663,973, 5,761,236, 6,081,542, 6,061,382, 6,154,470, 5,946,337, 5,095,492, 5,684,822, 5,835,520, 5,852,627, 5,856,991, 5,898,725, 5,901,163, 5,917,849, 5,970,082, 5,404,366, 4,975,919, 5,142,543, 5,596,596, 5,802,094, 4,856,018, 5,970,082, 5,978,409, 5,999,318, 5,150,370 and 4,829,536, and German patent DE 298 22 090.3, and any of the patent applications mentioned above and below herein, may be consulted to obtain a line-narrowing configuration that may be used with a preferred laser system herein, and each of these patent references is each hereby incorporated by reference into the present application.

Additional Laser System Features

Optics module 112 preferably includes means for outcoupling the beam 120, such as a partially reflective resonator reflector. The beam 120 may be otherwise outcoupled such as by an intra-resonator beam splitter or partially reflecting surface of another optical element, and the optics module 112 would in this case include a highly reflective mirror. The optics control module 114 preferably controls the optics modules 110 and 112 such as by receiving and interpreting signals from the processor 116, and initiating realignment, gas pressure adjustments in the modules 110, 112, or reconfiguration procedures (see the '353, '695, '277, '554, and '527 applications mentioned above).

The halogen concentration in the gas mixture is maintained constant during laser operation by gas replenishment actions by replenishing the amount of halogen in the laser tube for the preferred excimer or molecular fluorine laser herein, such that these gases are maintained in a same predetermined ratio as are in the laser tube 102 following a new fill procedure. In addition, gas injection actions such as μHIs as understood from the '882 application, mentioned above, may be advantageously modified into micro gas replacement procedures, such that the increase in energy of the output laser beam may be compensated by reducing the total pressure. In addition, the laser system is preferably configured for controlling the input driving voltage so that the energy of the output beam is at the predetermined desired energy. The driving voltage is preferably maintained within a small range around $HV_{opt}$, while the gas procedure operates to replenish the gases and maintain the average pulse energy or energy dose, such as by controlling an output rate of change of the gas mixture or a rate of gas flow through the laser tube 102. Advantageously, the gas procedures set forth herein permit the laser system to operate within a very small range around $HV_{opt}$, while still achieving average pulse energy control and gas replenishment, and increasing the gas mixture lifetime or time between new fills (see U.S. patent application Ser. No. 09/780,120, which is assigned to the same assignee as the present application and is hereby incorporated by reference).

In all of the above and below embodiments, the material used for any dispersive prisms, the prisms of any beam expanders, etalons or other interferometric devices, laser windows and the outcoupler is preferably one that is highly transparent at excimer or molecular fluorine laser wavelengths such as 248 nm for the KrF laser, 193 nm for the ArF laser and 157 nm for the $F_2$ laser. The materials are also capable of withstanding long-term exposure to ultraviolet light with minimal degradation effects. Examples of such materials are $CaF_2$, $MgF_2$, BaF2, LiF and $SrF_2$, and in some cases fluorine-doped quartz may be used, and for the KrF laser, fused silica may be used. Also, in all of the embodiments, many optical surfaces, particularly those of the prisms, may or may not have an anti-reflective coating on one or more optical surfaces, in order to minimize reflection losses and prolong their lifetime.

Also, the gas composition for the excimer or molecular fluorine laser in the above configurations uses either helium, neon, or a mixture of helium and neon as a buffer gas. For rare gas-halide excimer lasers, the rare gas is preferably maintained at a concentration of around 1.0% in the gas mixture. The concentration of fluorine in the gas mixture preferably ranges from 0.003% to around 1.0%, and is preferably around 0.1%. However, if the total pressure is reduced for narrowing the bandwidth, then the fluorine concentration may be higher than 0.1%, such as may be maintained between 1 and 7 mbar, and more preferably around 3–5 mbar, notwithstanding the total pressure in the tube or the percentage concentration of the halogen in the gas mixture. The addition of a trace amount of xenon, and/or argon, and/or oxygen, and/or krypton and/or other gases (see the '025 application) may be used for increasing the energy stability, burst control, and/or output energy of the laser beam. The concentration of xenon, argon, oxygen, or krypton in the mixture as a gas additive may range from 0.0001% to 0.1%, and would be preferably significantly below 0.1%. Some alternative gas configurations including trace gas additives are set forth at U.S. patent application Ser. No. 09/513,025 and U.S. Pat. No. 6,157,662, each of which is assigned to the same assignee and is hereby incorporated by reference.

A line-narrowed oscillator, e.g., a set forth above, may be followed by a power amplifier for increasing the power of the beam output by the oscillator. Preferred features of the oscillator-amplifier set-up are set forth at U.S. patent application Ser. Nos. 09/599,130 and 60/228,184, which are assigned to the same assignee and are hereby incorporated by reference. The amplifier may be the same or a separate discharge chamber 102. An optical or electrical delay may be used to time the electrical discharge at the amplifier with the reaching of the optical pulse from the oscillator at the amplifier. With particular respect to the $F_2$-laser, a molecular fluorine laser oscillator may have an advantageous output coupler having a transmission interference maximum at $\lambda_1$ and a minimum at $\lambda_2$. A 157 nm beam is output from the output coupler and is incident at the amplifier of this embodiment to increase the power of the beam. Thus, a very narrow bandwidth beam is achieved with high suppression of the secondary line $\lambda_2$ and high power (at least several Watts to more than 10 Watts).

While exemplary drawings and specific embodiments of the present invention have been described and illustrated, it is to be understood that that the scope of the present invention is not to be limited to the particular embodiments discussed. Thus, the embodiments shall be regarded as illustrative rather than restrictive, and it should be understood that variations may be made in those embodiments by workers skilled in the arts without departing from the scope of the present invention as set forth in the claims that follow, and equivalents thereof.

In addition, in the method claims that follow, the operations have been ordered in selected typographical sequences. However, the sequences have been selected and so ordered for typographical convenience and are not intended to imply any particular order for performing the operations, except for those claims wherein a particular ordering of steps is expressly set forth or understood by one of ordinary skill in the art as being necessary.

What is claimed is:

1. An excimer or molecular fluorine laser system, comprising:
   a discharge chamber filled with a gas mixture at least including molecular fluorine and a buffer gas;
   a plurality of electrodes within the discharge chamber connected to a discharge circuit for energizing the gas mixture;
   a resonator including a pair of resonator reflecting surfaces disposed on either side of the discharge chamber for generating a laser beam, said resonator further including a deformable third reflecting surface disposed between the pair of resonator reflecting surfaces;
   a line-narrowing/selection unit within the resonator for narrowing the bandwidth of the laser beam;
   a detector for detecting the bandwidth of the laser beam; and
   a processor for receiving a signal indicative of said bandwidth from said detector and controlling a surface contour of said deformable third reflecting surface to control said bandwidth in a feedback arrangement.

2. The laser system of claim 1, wherein said deformable third reflecting surface is a highly reflective mirror.

3. The laser system of claim 1, wherein said deformable third reflecting surface is a cylindrical mirror.

4. The laser system of claim 1, wherein said deformable third reflecting surface is a spherical mirror.

5. The laser system of claim 1, wherein said line-narrowing/selection unit includes a beam expander and dispersive element, and wherein said deformable third reflecting surface is disposed between said beam expander and said dispersive element.

6. The laser system of claim 1, wherein said line-narrowing/selection unit includes a dispersive element, and wherein said deformable third reflecting surface is disposed just before said dispersive element.

7. A line-narrowed excimer or molecular fluorine laser system, comprising:
   a discharge chamber filled with a gas mixture at least including molecular fluorine and a buffer gas;
   a plurality of electrodes within the discharge chamber connected to a discharge circuit for energizing the gas mixture;
   a resonator including a pair of resonator reflecting surfaces disposed on either side of the discharge chamber for generating a laser beam; and
   a third reflecting surface disposed between the pair of resonator reflector surfaces, the third reflecting surface being deformable such that a surface contour of the third reflecting surface can be adjusted to control the bandwidth of the laser beam.

8. The laser system of claim 7, further comprising deformation means for controllably adjusting the surface contour of said deformable third reflecting surface.

9. The laser system of claim 7, further comprising a line-narrowing/selection unit including a beam expander and dispersive element, and wherein said deformable third reflecting surface is disposed between said beam expander and said dispersive element.

10. The laser system of claim 7, further comprising a line-narrowing/selection unit including a dispersive element, and wherein said deformable third reflecting surface is disposed just before said dispersive element.

11. The laser system of claim 7, further comprising a processor for automatically adjusting the bandwidth of said laser by sending a signal to adjust said surface contour.

12. The laser system of claim 11, further comprising a detector for detecting the bandwidth of the laser system and communicating bandwidth information to the processor which controls said bandwidth in a feedback arrangement.

13. A line-narrowed excimer or molecular fluorine laser system, comprising:
   a discharge chamber filled with a gas mixture at least including molecular fluorine and a buffer gas;
   a plurality of electrodes within the discharge chamber connected to a discharge circuit for energizing the gas mixture;
   a resonator including a pair of resonator reflecting surfaces disposed on either side of the discharge chamber for generating a laser beam, said resonator further including a third reflecting surface disposed between the pair of resonator reflecting surfaces and having a surface contour which is deformable in order to control the bandwidth of the laser beam;
   a line-narrowing/selection unit within the resonator for narrowing the bandwidth of the laser beam; and
   a spectrometer for measuring the bandwidth of said laser beam.

14. The laser system of claim 13, further comprising a processor for receiving data from the spectrometer corresponding to a current bandwidth and for outputting a signal to adjust the surface contour of the deformable third reflecting surface corresponding to a desired bandwidth.

15. The laser system of claim 13, wherein said line-narrowing/selection unit includes a beam expander and dispersive element, and wherein said deformable third reflecting surface is disposed between said beam expander and said dispersive element.

16. The laser system of claim 13, wherein said line-narrowing/selection unit includes a dispersive element, and wherein said deformable third reflecting surface is disposed just before said dispersive element.

17. A line-narrowed excimer or molecular fluorine laser system, comprising:

a discharge chamber filled with a gas mixture at least including molecular fluorine and a buffer gas;

a plurality of electrodes within the discharge chamber connected to a discharge circuit for energizing the gas mixture;

a resonator including a pair of resonator reflecting surfaces disposed on either side of the discharge chamber for generating a laser beam, said resonator further including a third reflecting surface disposed between the pair of resonator reflecting surfaces and having a surface contour which is deformable;

a line-narrowing/selection unit within the resonator for narrowing the bandwidth of the laser beam; and a detector for detecting at least one parameter of the laser system including the bandwidth of the laser beam; and a processor for receiving a signal indicative of said at least one laser system parameter from said detector and controlling a surface contour of said deformable third reflecting surface in a feedback arrangement in order to control at least the bandwidth of the laser beam.

18. The laser system of claim 17, wherein said deformable third reflecting surface is a cylindrical mirror.

19. The laser system of claim 17, wherein said deformable third reflecting surface includes a curvature in two orthogonal cross-sectional beam axis directions.

20. The laser system of claim 17, wherein said laser system parameter is laser beam linewidth.

21. The laser system of claim 17, wherein said line-narrowing/selection unit includes a beam expander and dispersive element, and wherein said deformable third reflecting surface is disposed between said beam expander and said dispersive element.

22. The laser system of claim 17, wherein said line-narrowing/selection unit includes a dispersive element, and wherein said deformable third reflecting surface is disposed just before said dispersive element.

23. A line-narrowed excimer or molecular fluorine laser system, comprising:

a discharge chamber filled with a gas mixture at least including molecular fluorine and a buffer gas;

a plurality of electrodes within the discharge chamber connected to a discharge circuit for energizing the gas mixture;

a resonator including a pair of resonator reflecting surfaces disposed on either side of the discharge chamber for generating a laser beam, said resonator further including a third reflecting surface disposed between the pair of resonator reflecting surfaces and having a surface contour that can be modified to control the bandwidth of the laser beam;

a line-narrowing/selection unit within the resonator for narrowing the bandwidth of the laser beam, and wherein said line-narrowing/selection unit includes a dispersive element, and wherein said deformable third reflecting surface is disposed just before said dispersive element.

24. The laser system of claim 23, wherein said line-narrowing/selection unit further includes a beam expander, and wherein said deformable third reflecting surface is disposed between said beam expander and said dispersive element.

25. A method of adjusting the bandwidth of a line-narrowed excimer or molecular fluorine laser including a discharge chamber having a gas mixture and a plurality of electrodes therein within a resonator for generating a laser beam, the resonator including a pair of resonator reflectors disposed on either side of the discharge chamber for generating a laser beam and a deformable third reflecting surface disposed between a pair of resonator reflectors, comprising the operations:

applying electrical pulses to the plurality of electrodes within said discharge chamber for energizing the gas mixture therein;

measuring a bandwidth of the laser beam; and adjusting a surface contour of said deformable third reflecting surface for adjusting the bandwidth of the laser beam based on the measured bandwidth.

26. The method of claim 25, further comprising the operations transmitting a signal to a processor corresponding to the measured bandwidth, and transmitting another signal to the deformable third reflecting surface corresponding to a selected surface contour adjustment.

27. An excimer or molecular fluorine laser, comprising:

a discharge chamber filled with a gas mixture;

a plurality of electrodes in the discharge chamber connected to a pulse power circuit for energizing the gas mixture; and a resonator for generating a laser beam, including one or more line-narrowing/selection optics, a pair of resonator reflectors and a deformable third reflecting surface disposed between the pair of resonator reflectors having an adjustable surface contour for matching the wavefront of the beam to reduce the bandwidth narrowed/selected by the line-narrowing/selection unit.

28. The laser of claim 27, wherein the one or more line-narrowing/selection optics include a dispersive element, and wherein the deformable third reflecting surface is disposed just before the dispersive element.

29. The laser of claim 28, wherein the one or more line-narrowing/selection optics include a beam expander, and wherein the deformable third reflecting surface is disposed between the beam expander and the dispersive element.

30. The laser of claim 29, wherein the dispersive element is a grating serving as one of said pair of resonator reflectors.

31. The laser of claim 28, the resonator further comprising an interferometric device.

32. The laser of claim 27, wherein the adjustable surface contour of the deformable third reflecting surface is automatically feedback controlled using a processor and a detector for monitoring a spectral parameter of the laser beam.

33. A resonator for an excimer or molecular fluorine laser system, comprising:

a discharge chamber for filling with a gas mixture;

a plurality of electrodes within the discharge chamber for connecting to a discharge circuit for energizing the gas mixture;

a pair of resonator reflectors for generating a laser beam; and a bi-directional bandwidth controlled folding mirror assembly disposed between the pair of resonator reflectors, the mirror assembly including:

a folding mirror;

a coupling plate coupling with the mirror;

an adjustment spindle penetrating through a cavity defined in the coupling plate, and wherein screwing the adjustment spindle in a first direction increases a concavity of a surface contour of the folding mirror, and screwing the adjustment spindle in a second direction opposite to said first direction decreases the concavity of the surface contour of the folding mirror.

34. The resonator of claim 33, further comprising at least one spring disposed between a portion of said coupling plate and a head of said adjustment spindle.

35. The resonator of claim 33, further comprising a movable nut on the adjustment spindle.

36. The resonator of claim 33, further comprising a motor for motorizing the adjustment spindle.

37. The resonator of claim 33, wherein the surface contour of the folding mirror is convex.

38. The resonator of claim 33, wherein the surface contour of the folding mirror is concave.

39. The resonator of claim 33, further comprising a line narrowing/selection unit including at least one optical element having an adjustable orientation for tuning a wavelength of the laser beam, and wherein said adjusting of said surface contour of said folding mirror adjusts the bandwidth of the laser beam.

40. The resonator of claim 39, wherein the line narrowing/selection unit includes a beam expander and a dispersive element, and wherein the folding mirror is disposed between the beam expander and the dispersive element.

41. The resonator of claim 33, wherein the bi-directional bandwidth controlled folding mirror assembly is configured such that the surface contour of the folding mirror is adjustable based on signals received from a detector for monitoring the bandwidth of the laser beam.

42. A resonator for an excimer or molecular fluorine laser system, comprising:
   a discharge chamber for filling with a gas mixture;
   a plurality of electrodes within the discharge chamber for connecting to a discharge circuit for energizing the gas mixture;
   a pair of resonator reflectors for generating a laser beam; and
   a bi-directional bandwidth controlled folding mirror assembly disposed between the pair of resonator reflectors, the mirror assembly including:
      a folding mirror;
      a coupling plate coupling with the mirror;
      a piezo transducer coupled with the coupling plate, and
      wherein operating the piezo transducer in a first direction increases a concavity of the folding mirror, and operating the piezo transducer in a second direction opposite to said first direction decreases a concavity of the folding mirror.

43. The assembly of claim 42, wherein the folding mirror is convex.

44. The assembly of claim 42, wherein the folding mirror is concave.

45. The resonator of claim 42, further comprising a line narrowing/selection unit including at least one optical element having an adjustable orientation for tuning a wavelength of the laser beam, and wherein said adjusting of said surface contour of said folding mirror adjusts the bandwidth of the laser beam.

46. The resonator of claim 42, wherein the line narrowing/selection unit includes a beam expander and a dispersive element, and wherein the folding mirror is disposed between the beam expander and the dispersive element.

47. The resonator of claim 42, wherein the bi-directional bandwidth controlled folding mirror assembly is configured such that the surface contour of the folding mirror is adjustable based on signals received from a detector for monitoring the bandwidth of the laser beam.

* * * * *